No. 626,561. Patented June 6, 1899.
A. G. PERRY.
COMBINED COTTON SEED PLANTER AND FERTILIZER DISTRIBUTER.
(Application filed Nov. 7, 1898.)

(No Model.)

Witnesses.
Robert Everett
W. B. Keely

Inventor:
Alvy G. Perry,
By James L. Norris.
Atty.

UNITED STATES PATENT OFFICE.

ALVY G. PERRY, OF COLDWATER, MISSISSIPPI.

COMBINED COTTON-SEED PLANTER AND FERTILIZER-DISTRIBUTER.

SPECIFICATION forming part of Letters Patent No. 626,561, dated June 6, 1899.

Application filed November 7, 1898. Serial No. 695,749. (No model.)

*To all whom it may concern:*

Be it known that I, ALVY G. PERRY, a citizen of the United States, residing at Coldwater, in the county of Tate and State of Mississippi, have invented new and useful Improvements in Cotton-Seed-Planter and Fertilizer-Distributer Attachments, of which the following is a specification.

This invention relates to an improved cotton-seed-planter and fertilizer-distributer attachment, and is in the nature of an improvement on the cotton-seed planter and fertilizer-distributer for which Letters Patent No. 290,920 were granted to me on December 25, 1883. In said Letters Patent I show and describe, among other features of invention, a seed and fertilizer hopper mounted on a wheeled axle which passes transversely through the hopper, said hopper having a slitted bottom. Upon the axle are arranged a plurality of radial arms, which operate to loosen and agitate the seed or fertilizer and prevent it from packing, and on the center of the axle and in alinement with the slit in the bottom of the hopper are arranged a plurality of radial feed-arms, which as the axle revolves successively pass through the slit in the bottom of the hopper, carrying before them the seed or fertilizer.

It is the object of the present invention to improve the construction of the axle carrying the agitator and feed arms and the means for attaching said arms to the axle, whereby said axle and arms are made exceedingly strong, durable, and easy of application to the implement and to provide improved means for preventing the seed or fertilizer from working into the axle-bearings and clogging up the same.

To these ends my invention consists in the features and in the construction, combination, and arrangement of parts hereinafter described, and particularly pointed out in the claims following the description, reference being had to the accompanying drawings, forming a part of this specification, wherein—

Figure 1:
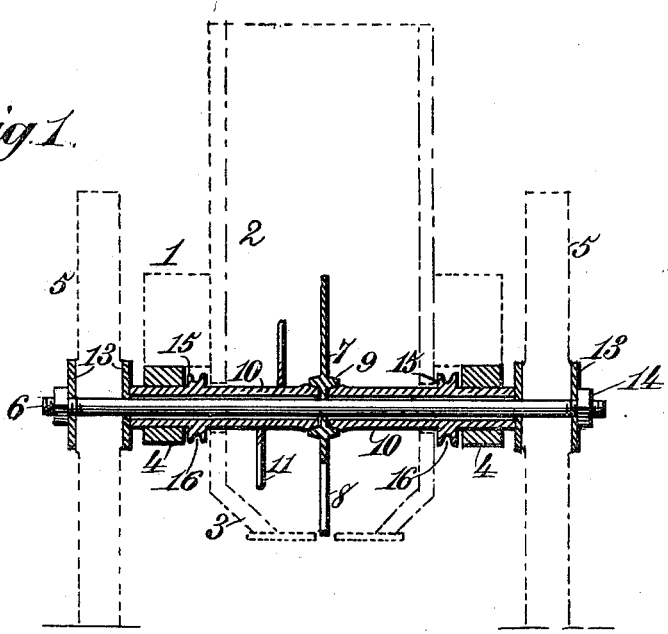
Figure 2:
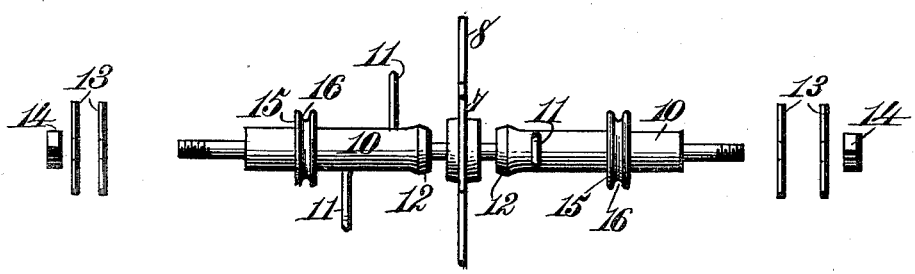
Figure 3:
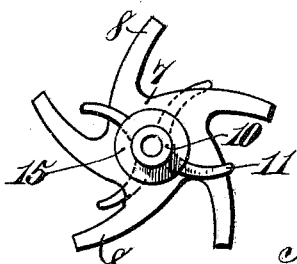

Figure 1 is a vertical sectional view taken centrally through the axle, the hopper, wheels, and similar parts being shown by dotted lines. Fig. 2 is a detail perspective view showing the parts of the axle and the parts carried thereby separated, and Fig. 3 is an end view thereof.

Referring to the drawings, the numeral 1 indicates the frame of the implement, upon which are supported the seed or fertilizer box 2 and the hopper 3. Upon the bottom of the frame 1 are fixed bearings 4, in which is journaled the axle, on the opposite ends of which are rigidly fixed the wheels 5. The axle passes transversely through the hopper 3 and consists of a metallic rod 6, which is threaded at its opposite ends and has centrally arranged thereon a feed-disk 7, provided on its periphery with a plurality of curved feed-arms 8. The feed-arms and disks are preferably cast integrally of metal, and the disk is provided centrally with an aperture for the passage of the rod 6. Formed about said aperture on the opposite sides of the disk are bosses or annular flanges 9, which are tapered or beveled inwardly, as shown and for the purpose hereinafter explained. Arranged on the axle-rod 6, on each side of the feed-disk 7, are sleeves 10, which are of a length sufficient to reach from the feed-disk to and through the axle-bearings 4, and each of said sleeves has cast integrally therewith a plurality of curved agitator-arms 11. The inner or adjacent ends of said sleeves are tapered, as shown at 12, and fit in the tapered bosses or flanges 9. The hubs of the wheels 5 are fitted on the threaded ends of the axle-rod 6, that projects through the sleeves 10, and arranged on the rod on each side of the hubs are square or polygonal washers 13. Nuts 14 are screwed on the threaded ends of the axle-rod 6, and when said nuts are tightened up they draw or force the tapered ends 12 of the sleeves firmly into the internally-tapered bosses or flanges 9 of the feed-disk, thus making a strong attachment between the sleeves and disk and preventing the feed and agitator arms from rotating independently of the axle and of each other. When the nuts are tightened up, they forcibly press the washers 13 against the opposite ends of the wooden hubs of the wheels 5, causing the corners or angles of said washers to take into the ends of the hubs and firmly hold the wheels against rotation on the axle. Thus when the wheels are rotated the rod 6 and sleeves 10 are compelled to rotate therewith and the agitator and feed arms are operated to loosen up and agitate the seed or fertilizer and feed the same through the slitted bottom of the hopper.

Formed on the sleeves 10 near their outer ends are collars 15, which are circumferentially grooved, as shown at 16. As shown most clearly in Fig. 1 of the drawings, the collars 15 are disposed on the outer opposite sides of the fertilizer-box. Many of the commercial fertilizers on the market are of such a nature that when they are distributed by a machine the agitator or feed arms have to force their way through the fertilizer close to the inside of the fertilizer-box, causing the fertilizer to work out around the axle, and as the fertilizer passes through the box around the axle it works up into a kind of paste or gummy substance somewhat resembling beeswax. This paste sticks to the axle and travels on the latter until it works into the bearings, causing the axle to stick, and in the course of time altogether preventing its rotation. By arranging the grooved collars 15 as shown the paste that forms on the axle as it works out of the sides of the fertilizer-box must cross over said collars before it can enter the bearings, and this it will not do, for in making the turn necessary to cross the groove the paste or wax-like substance will break and fall off the collar, thus preventing its reaching the axle-bearings.

Having described my invention, what I claim is—

1. In a seed-planter and fertilizer-distributer, the combination with the carriage and the slitted hopper supported thereon, of the axle passing transversely through the hopper and comprising an axle-rod having ground-wheels fixed on its opposite ends, a feed-disk centrally arranged on the axle-rod and provided on its opposite sides with interiorly-tapered bosses or annular flanges, sleeves arranged on the axle-rod on each side of the feed-disk and having tapered ends fitted in the tapered bosses or flanges, and means for forcing said sleeves inwardly into engagement with the feed-disk and for locking them on the axle-rod, substantially as described.

2. In a seed-planter and fertilizer-distributer, the combination with the carriage and the slitted hopper supported thereon, of the axle passing transversely through the hopper and comprising an axle-rod having ground-wheels fixed on its opposite ends, a feed-disk centrally arranged on the axle-rod and provided on its opposite sides with interiorly-tapered bosses or annular flanges, sleeves arranged on the axle-rod on each side of the feed-disk and provided with a plurality of agitator-arms, the inner ends of said sleeves being tapered and fitted in the tapered bosses on the feed-disk, and means for forcing the sleeves inwardly into engagement with the bosses and for locking them on the axle-rod substantially as described.

3. In a seed-planter and fertilizer-distributer, the combination with the carriage and the slitted hopper supported thereon, of the axle passing transversely through the hopper and comprising an axle-rod threaded at its opposite ends, a feed-disk centrally arranged on the axle-rod and provided on its opposite sides with interiorly-tapered bosses or annular flanges, sleeves arranged on the axle-rod on each side of the feed-disk and provided with a plurality of agitator-arms, the inner ends of said sleeves being tapered and fitted in the tapered bosses on the feed-disk, ground-wheels arranged on the threaded ends of the axle-rod, and nuts screwed on said threaded portions of the axle-rod and operating to force said sleeves into engagement with the bosses on the feed-disk and lock said wheels, sleeves and feed-disk on the axle-rod, substantially as described.

4. In a seed-planter and fertilizer-distributer, the combination with the carriage, and the slitted hopper, of the axle-rod passing transversely through the hopper, the feed-disk centrally arranged on the axle-rod, sleeves arranged on the axle-rod on each side of the feed-disk and journaled at their outer ends in bearings fixed on the carriage, said sleeves being provided with circumferentially-grooved collars in proximity to the bearings, wheels fitted on the extremities of the axle-rod, and means for rigidly securing the wheels, sleeves and feed-disk on the axle-rod, substantially as described.

5. In a seed-planter and fertilizer-distributer, the combination with the carriage, the hopper and the axle passing through the hopper and journaled in bearings at its opposite end portions, of circumferentially-grooved collars on the axle adjacent to the inner ends of said bearings, substantially as described and for the purpose specified.

In testimony whereof I have hereunto set my hand in presence of two subscribing witnesses.

ALVY G. PERRY.

Witnesses:
P. H. WRIGHT,
A. A. ROYALL.